US005545830A

United States Patent [19]

Ziemelis et al.

[11] Patent Number: 5,545,830

[45] Date of Patent: Aug. 13, 1996

[54] CURABLE FLUORESCENT ORGANOPOLYSILOXANE COMPOSITIONS

[75] Inventors: Maris J. Ziemelis, Midland, Mich.; Eng-Pi Chang, Arcardia, Calif.; Mitchell A. Winnik, Ontario, Canada

[73] Assignee: Dow Corning Corporation, Midland, Mich.

[21] Appl. No.: 367,496

[22] Filed: Dec. 30, 1994

[51] Int. Cl.[6] .......... C08G 77/08

[52] U.S. Cl. .......... 528/15; 528/25; 528/32; 528/43; 528/28; 427/387; 428/447; 428/451

[58] Field of Search .......... 528/25, 15, 32, 528/43, 28; 427/387; 428/447, 451

[56] References Cited

U.S. PATENT DOCUMENTS

| | | | |
|---|---|---|---|
| 3,419,593 | 12/1968 | Willing | 260/448.2 |
| 4,866,152 | 9/1989 | Lo | 528/25 |
| 4,982,603 | 1/1991 | Lo | 73/150 |
| 5,047,444 | 9/1991 | DeVoe et al. | 522/99 |
| 5,107,008 | 4/1992 | Revis et al. | 556/425 |
| 5,118,776 | 6/1992 | Revis et al. | 528/15 |
| 5,182,353 | 1/1993 | Hui et al. | 528/15 |

OTHER PUBLICATIONS

Deh Ying Chu and J. K. Thomas; "Photophysical Studies of Molecular Mobility in Polymer Films and Bulk Polymers. 3. Dynamic Eximer Formation of Pyrene in Bulk PDMS," Macromolecules, vol. 23, pp. 2217–2222, 1990.

M. A. Winnik, A. E. C. Redpath, P. Svirskaya and A. Mar; "The Influence of Polymer Concentration On The Internal Motion–Intramolecular Pyrene Eximer Formation—Of a Low Molecular Weight Probe In Solution," Polymer, pp. 473–475, 1983.

*Primary Examiner*—Melvyn I. Marquis
*Attorney, Agent, or Firm*—Sharon K. Severance; Rick D. Streu

[57] ABSTRACT

Pyrene based fluorescent organopolysiloxanes which bear two or more reactive silicon-bonded sites are useful as durable markers and indicators of the degree of cure in curable silicone compositions. Having more than one reactive site the compounds participate in the curing reaction of the curable composition and thus do not adversely affect its curing behavior. The resulting fluorescent curable compositions are particularly useful in the preparation of adhesive-release coatings.

16 Claims, No Drawings

CURABLE FLUORESCENT ORGANOPOLYSILOXANE COMPOSITIONS

BACKGROUND OF THE INVENTION

The present invention relates to curable fluorescent organopolysiloxane compositions and to reactive fluorescent organopolysiloxanes used therefor. More particularly the present invention relates to silicone coatings which comprise new reactive fluorescent organopolysiloxane compositions that are durable markers and cure monitors in the cured silicone coatings.

Cured silicone coatings have been used for a long time in the manufacture of peelable backings for adhesive-bearing items, such as labels and tapes. An uncured silicone coating is generally applied to a substrate, such as paper or plastic film, as a thin (e.g. 0.5 micrometer) layer of a curable liquid composition and subsequently cured to a crosslinked film by the application of heat or radiation; The thus-coated backing is thereafter brought into releasable contact with an adhesive layer from which it is to be peeled.

Since the cured release coating is typically too thin and/or too transparent to be seen with the unaided eye it is difficult to determine which side of a coated backing bears the cured release coating and how continuous that coating is. Consequently, in the use of the peelable backing, there exists the possibility of bringing an uncoated, or improperly coated, surface of the backing into non-releasable contact with an adhesive layer. A non-destructive method for detecting the presence and continuity of a silicone release coating oil a backing, preferably during the formation of the peelable backing, would thus be beneficial. Furthermore, it is desirable to measure the degree of cure of a coating on a substrate so as to be able to monitor and control the degree of cure on-line, i.e. during the production of the peelable backing, in an economical and effective manner.

The addition of visible colorants (pigments or dyes) to a curable silicone coating has been found to be generally unsatisfactory since the high levels of colorants needed to obtain visual differentiation can adversely effect the cure of the coating and/or the adhesive release properties of the cured coating. Additionally, a colored coating is sometimes aesthetically undesirable. Besides, degree of cure cannot be ascertained using the visible colorants approach.

U.S. Pat. No. 4,866,152 to Lo relates to fluorescent silanes and polysiloxanes for use as optical brighteners. These fluorescent materials are prepared by a process comprising contacting an amino-organofunctional silicon compound with certain optical brightening agents which are, specifically, fluorescent sulfonic acids (to form a sulfonamide linkage) or fluorescent aldehydes (to form an imino linkage) and recovering the desired fluorescent organosilicon compound. Also claimed are the fluorescent organosilicon compounds, laundry detergent or hair dye containing fluorescent organosilicon compounds, a fluorescent elastomeric film derived from reacting the fluorescent organosilicon compounds with a polyfunctional acrylate, and a fluorescent tack-free resinous film derived from exposing the fluorescent organosilicon compounds to moisture. One such example of an optical brightener is an aminofunctional organosiloxane compound with at least one aldehyde functional optical brightener which is a pyrene derivative. While the treatment of paper to achieve whitening is suggested, Patentee makes no suggestion of the use of fluorescent compounds in adhesive release coating compositions.

In another approach to the problem of detection of a silicone coating on a substrate, U.S. Pat No. 4,982,603, to Lo, claims a quality assurance test method for indicating the extensiveness of a silicone treatment upon a substance such as paper which is otherwise invisible under normal light conditions including the steps of treating the substrate with an organosilicon compound and examining the treated substrate for fluorescence under ultraviolet light. Patentee makes no suggestion regarding determination of degree of cure of said compositions on a substrate.

U.S. Pat. No. 5,047,444 to DeVoe et al. relates to curable compositions containing as cure monitors, dibenzofulvene derivatives and a method for measuring degree of cure of a polymeric material which can be a coating or article. The cure monitors are latent fluorophores which react under the cure conditions to form UV-detectable fluorophores upon exposure to a UV light source of a particular wavelength. The intensity of the emitted light from the fluorophore can be used to determine whether proper cure has been achieved. This method requires that the cure monitor be selected so that the conversion rate of the latent fluorophore to form the fluorophore is comparable to the cure rate of the coating.

U.S. Pat. No. 5,107,008 to Revis et al. relates to curable fluorescent organopolysiloxane release coating compositions and to reactive fluorescent compounds therefor. These compounds when incorporated into the release coating provide fluorescence when exposed to ultraviolet light, which is different, and detectable apart, from the fluorescence that is produced by the paper-whitening components used in the paper industry. The fluorescence emission spectra of dansyl functional siloxanes compositions of that invention show a single emission wavelength maximum of 465 nanometers. There is no indication that those compositions exhibit dimer or eximer formation making those compositions inoperable under the instant invention. While the exposure to ultraviolet light of the cured coating is suggested as having utility for measuring coating thickness by measuring coating fluorescence, Patentee makes no suggestion regarding determination of degree of cure of said compositions on a substrate.

Pyrene-containing radicals are able to fluoresce in both the monomer and dimer or excimer states when exposed to ultraviolet radiation. Each of these states emits radiation of a distinct wavelength or range of wavelengths. Chu et al. in Macromolecules 1990, 23, 2217-2222 report that pyrene excimer formation can be correlated to viscosity when pyrene solutions in methylethylketone were dissolved in poly- dimethylsiloxanes of different viscosities. Those authors make no suggestion of fluorescent adhesive release coating compositions. Winnik et al. in Polymer, 1983, vol 24 (4), 473–475, report the use of pyrene endblocked siloxanes in solvent to study molecular mobility in polydimethylsiloxanes. Those authors make no suggestion of fluorescent adhesive release coating compositions.

SUMMARY OF THE INVENTION

It is an object of the present invention to provide new organopolysiloxane polymers and compositions which fluoresce when exposed to ultraviolet light. It is another object of this invention to provide fluorescent organopolysiloxane polymers which can be reacted with a curable organopolysiloxane coating composition without adversely effecting the curing of the coating composition. It is a particular object of this invention to provide addition-curing adhesive release compositions which can be detected on a substrate by way of fluorescence under ultraviolet light. Yet another object is to provide curable coating compositions whose degree of cure can be ascertained through the use of fluorescing organopolysiloxanes.

These objects, and others which will become apparent to one of ordinary skill in the silicone coatings art after reading this specification, are obtained by the present invention which, briefly stated, comprises providing multiple reactive fluorescent organopolysiloxane polymers which call be used as curing components in a curable coating composition. The present invention further comprises mixing this multiply reactive fluorescent organopolysiloxane polymer with a curable organopolysiloxane coating composition in an amount which is sufficient to provide at least a detectable amount of fluorescent radiation from a thin layer of the coating when it is exposed to ultraviolet light. In a preferred embodiment of the present invention a pyrene based radical-containing organopolysiloxane bearing two or more silicon-bonded reactive sites is incorporated as a curing component into an addition-curable adhesive-release coating.

DETAILED DESCRIPTION OF THE INVENTION

The present invention relates to Organopolysiloxane polymers having the general formula selected from the formula consisting essentially of (i) $RR^1_2SiO(R^1_2SiO)_x(R^1RSiO)_y(R^1LSiO)_zSiR^1_2R$, (ii) $RR^1_2SiO(R^1RSiO)_y(R^1LSiO)_zSiR^1_2R$, (iii) $RR^1_2SiO(R^1_2SiO)_x(R^1LSiO)_zSiR^1_2R$, and (iv) $RR^1_2SiO(R^1_2SiO)_x(:R^1RSiO)_ySiR^1_2R$;

where $R^1$ denotes a radical selected from the group consisting essentially of alkyl radicals having 1 to 4 carbon atoms and phenyl; L is a silicon-bonded monovalent organic radical having the general formula $R^2N{=}CHC_{16}H_9$ where $R^2$ is a divalent hydrocarbon radical and where $=CHC_{16}H_9$ is a pyrenylidene nucleus; each R is independently selected from the group consisting essentially of monovalent hydrocarbon radicals, monovalent halogenated hydrocarbon radicals, olefinic hydrocarbon radicals having 2 to 8 carbon atoms, hydroxyl radicals, and L radicals; there being at least 2 reactive olefinic sites on average per molecule of said polymers and at least one L radical on average per molecule of said polymers and the sum of x+y+z has a value of at least one.

In the general formula immediately above when R denotes monovalent hydrocarbon or halogenated hydrocarbon radicals, they are understood for purposes of this invention to be any silicon-bonded monovalent hydrocarbon or halogenated hydrocarbon radical which contains no aliphatic unsaturation and which has, preferably, no more than 20 carbon atoms, and most preferably from 1 to 6 carbon atoms.

Examples of monovalent hydrocarbon radicals which are encompassed by R include alkyl radicals, such as methyl, ethyl, and the straight- and branched-chain forms of propyl, hexyl, octyl, decyl and octadecyl; cycloaliphatic radicals, such as cyclohexyl; and radicals bearing an aromatic nucleus, such as phenyl, tolyl, benzyl, phenylethyl and xylyl.

Examples of halogenated hydrocarbon radicals which are encompassed by R include any of the hydrocarbon radicals encompassed above wherein one or more hydrogen atoms have been replaced with a halogen atom, preferably chlorine or fluorine. It is preferred that aliphatic carbon atoms of the halogenated hydrocarbon radicals which are directly bonded to, or one carbon atom removed from, a silicon atom not contain a halogen atom.

The aliphatic R radicals are preferably selected from the group of commercially used radicals such as methyl, phenyl and perfluoroalkylethyl having the formula $CF_3(CF_2)_nCH_2CH_2$— wherein n has a value of 0 or is an integer, preferably 0 to 10, and most preferably 0 to 4.

When the organopolysiloxane polymer is to be incorporated into an organic pressure sensitive adhesive-release coating composition the methyl radical constitutes at least 90 mol percent, and preferably at least 95 mol percent, of all hydrocarbon or halogenated hydrocarbon radicals of the polymers of this invention. When the organopolysiloxane polymer is to be incorporated into a silicone pressure sensitive adhesive-release coating composition the perfluoroalkylethyl having the formula $CF_3(CF_2)_nCH_2CH_2$—, noted above, constitutes 5–50 mol percent, preferably 10–25 mol percent, of all the hydrocarbon or halogenated hydrocarbon radicals.

Examples of olefinic hydrocarbon radicals encompassed by R include vinyl and the straight or branched-chain forms of allyl, butenyl, pentenyl, hexenyl and octenyl. It is preferred that at least two, and most preferably all, of the olefinic hydrocarbon radicals contain at least one $CH_2{=}CH$— radical. It is preferred that the olefinic radicals be selected from the group of commercially used reactive radicals such as vinyl and 5-hexenyl.

The organopolysiloxane polymers of this invention must contain at least two, and preferably contain more than two, olefinic radicals in order to be useful as a reactive component in an addition-curing composition without substantially adversely affecting the cure of the composition.

Each $R^1$ in the above formula denotes, independently an alkyl radical having 1 to 4 carbon atoms or the phenyl radicals examples of alkyl radicals including methyl, ethyl and others. It is preferred that $R^1$for use in pressure sensitive adhesive-release coating compositions, be at least 90 mol percent and more preferably at least 95 mol percent methyl radical.

Each L in the above formula denotes, independently, any silicon-bonded monovalent organic radical containing a fluorescent pyrene derivative having the general formula $R^2N{=}CHC_{16}H_9$ where $R^2$ is a divalent hydrocarbon radical and where $=CHC_{16}H_9$ is a pyrenylidene nucleus. For maximum hydrolytic stability it is preferred that L be bonded to Si by a silicon-carbon bond.

It is preferred that L contain a pyrene based radical, such as the pyrenylidene nucleus, since this radical provides preferred fluorescence for the organopolysiloxane compounds and compositions of this invention when exposed to ultraviolet light. The pyrene based radicals, when exposed to ultraviolet light, are able to fluoresce in both the monomer and dimer or excimer states. Each of these states emits radiation of a distinct wavelength or range of wavelengths.

For the purpose of this invention, a pyrenylidene nucleus has the formula $=CHC_{16}H_9$ and is bonded through its non-aromatic carbon atom to nitrogen.

In the preferred embodiments of this invention the monovalent organic radical bearing a pyrenylidene nucleus is bonded to a silicon atom by way of a divalent organic linking radical, one terminal of which is a carbon atom bonded to the silicone atom and the other terminal of which is a nitrogen atom bonded to the pyrenylidene nucleus. Examples of these divalent organic linking radicals include, but are not limited to, radicals having the formula $—R^2(NHR^2)_gNR^3—$ in which $R^2$ is a divalent hydrocarbon radical, $R^3$ is hydrogen or an alkyl radical having 1 to 6 carbon atoms and the subscript g has a value of 0 to 4. It is understood that polyamino linking radicals wherein g exceeds 0 may contain more than one pyrenylidene nucleus.

In preferred embodiments of this invention, the linking group is $—R^2NH$. In these embodiments $R^2$ is a divalent hydrocarbon group having from 3 to 6 carbon atoms such as trimethylene, tetramethylene or isobutylene. Examples are $—CH_2CH_2CH_2NH—$, $—CH_2CH(CH_3)CH_2N(CH_3)—$, $—CH_2CH(CH_3)CH_2NH—$ and $—CH_2CH_2CH_2N(CH_3)—$.

It is within the scope and spirit of this invention that the claimed organopolysiloxanes can further contain trace amounts of silicon-bonded radicals which arise from intermediates that are used in the preparation of the polymers of this invention. For example, trace amounts of amine-containing radicals may remain unreacted after a pyrene containing compound, such as 1-pyrenecarboxaldehyde, is used to introduce the pyrenylidene nucleus into an aminoalkyl-substituted organosiloxane.

The polysiloxanes of this invention preferably have the linear formula $RR^1SiO(R^1{}_2SiO)_x(R^1RSiO)_y(R^1LSiO)_zSiR^1{}_2R$. In this formula each R denotes, independently, a radical selected from the group consisting essentially of monovalent hydrocarbon radicals, monovalent halogenated hydrocarbon radicals, olefinic hydrocarbon radicals and L radicals, noted above, including preferred embodiments, $R^1$ denotes a radical selected from the group consisting of alkyl radicals having 1 to 4 carbons and the phenyl radical and x+ y+ z has the value of at least 1.

For example, both terminal R radicals can be a hydrocarbon radical, such as methyl, in which case the value of y must be at least two and the value of z must be at least one in order to provide the required number of L radicals and olefinic reaction sites. Alternatively, both terminal R radicals can be either L radicals or olefinic radicals thereby permitting, but not requiring, the value of y or z to be zero.

The average values of x, y and z can be zero or more provided that the organopolysiloxane contains at least one L radical and at least two olefinic reactive sites. The value of x typically ranges from 0–3000, preferably from 10–1000 and most preferably from 50–500. The values of y and z preferably range from 0–100 and most preferably from 0–10.

The sum of x+ y+ z must have a value of one or more. Its desired value will depend upon the use to which the organopolysiloxane is applied. However, for most applications, it is desired that the organopolysiloxane be a liquid, and preferably a flowable liquid, and an upper value for the sum of x y+ z of about 3,000, preferably 500, and most preferably about 200 is appropriate. The organopolysiloxanes of this invention can have a viscosity ranging up to 100 million, most preferably from 10 to 10 thousand and for coating applications, from 100–1000 cP (centipoise) at 25° C.

Examples of preferred linear organopolysiloxanes of this invention include, but are not limited $Me_3SiO(Me_2SiO)_x(MeViSiO)_y(MeLSiO)_zSiMe_3$,
$ViMe_2SiO(Me_2SiO)_x(MeViSiO)_y(MeLSiO)_zSiMe_2Vi$,
$ViMe_2SiO(Me_2SiO)_x(MeLSiO)_zSiMe_2Vi$,
$LMe_2SiO(Me_2SiO)_x(MeViSiO)_y(MeLSiO)_zSiMe_2L$, and
$LMe_2SiO(Me_2SiO)_x(MeViSiO)_ySiMe_2L$, wherein x, y and z have values at least sufficient to provide the required number of fluorescent radicals and reactive olefinic sites.

The organopolysiloxanes of this invention can be prepared by adapting known organosilicon synthesis methods for preparing fluorescent radical-containing organopoly-siloxanes to also incorporate reactive sites. For example, U.S. Pat. Nos. 4,866,152, 5,107,008, and 5,118,776 are incorporated herein by reference to show various fluorescent nuclei and how to introduce those nuclei into silane and/or siloxane precursors for the preparation of the organopoly-siloxanes of this invention. Once having read this disclosure, and the teachings of the incorporated patents, one of ordinary skill in the organosilicon arts will be able to synthesize numerous materials which contain one or more fluorescent radicals and two or more reaction sites for an addition cure, and will thus be within the scope and spirit of the present invention.

As disclosed above, preferred organopolysiloxanes of this invention contain a pyrenylidene nucleus. These organopolysiloxanes can be readily produced, for example, by the reaction of an aminofunctional silane or siloxane with a pyrene-containing compound such as 1-pyrenecarboxaldehyde which provides and imine product, which product is fluorescent in the green region of the spectrum; followed by the introduction of silicon-bonded reactive sites, if more are needed, by standard siloxane synthesis methods. Alternatively, the silicon-bonded reactive sites could be introduced prior to the reaction with the pyrenylidene nucleus.

As noted above, the organopolysiloxane compounds of this invention are useful as durable markers in addition-curing silicone coating compositions. These polymers can be used either as an additive in an addition-curable silicone composition or they can be used, along with typical coreactants, to formulate addition-curable compositions.

Thus, the present invention further relates to a curable composition comprising (A) 1 to 100 parts by weight of an organopolysiloxane compound having the general formula selected from the formula consisting essentially of (i) $RR^1{}_2SiO(R^1{}_2SiO)_x(R^1RSiO)_y(R^1LSiO)_zSiR^1{}_2R$,
(ii) $RR^1{}_2SiO(R^1RSiO)_y(R^1LSiO)_zSiR^1{}_2R$,
(iii) $RR^1{}_2SiO(R^1{}_2SiO)_x(R^1LSiO)_zSiR^1{}_2R$, and
(iv) $RR^1{}_2SiO(R^1{}_2SiO)_x(R^1RSiO)_ySiR^1{}_2R$;

where $R^1$ denotes a radical selected from the group consisting essentially of alkyl radicals having 1 to 4 carbon atoms and phenyl; L is a silicon-bonded monovalent organic radical having the general formula $—R^2N{=}CHC_{16}H_9$ where $R^2$ is a divalent hydrocarbon radical and where $=CHC_{16}H_9$ is a pyrenylidene nucleus; each R is selected from the group consisting essentially of monovalent hydrocarbon radicals: olefinic hydrocarbon radicals having 2 to 8 carbon atoms hydroxyl radicals, and L radicals; there being at least 2 reactive olefinic sites on average per molecule of said polymers and at least one L radical on average per molecule of said polymers and the sum of x+ y+ z has a value of at least one;

(B) an amount of a methylhydrogen polysiloxanes sufficient to provide from 0.8 to 4 silicon-bonded hydrogen atoms for every silicon-bonded olefinic radical in the composition;

(C) a hydrosilylation catalyst; and (D) 100 parts by weight of an organopolysiloxane bearing at least two silicon-bonded olefinic radicals.

In the curable compositions of this invention the fluorescent organopolysiloxane (A) can be any of the organopolysiloxanes of this invention, including preferred embodiments, herein delineated.

For use in release coatings it is preferable that in the fluorescent organopolysiloxane (A) that x+ y+ z be a sum such that (A) is soluble in component (D) and that at least 90% of $R^1$ groups be methyl. Solubility of the (A) in (D) can be obtained by increasing x, preferably such that x>100, thereby increasing the dimethyl functionality and/or by limiting number of L radicals to less than 5 and preferably less than 3. One skilled in the art will be able to determine the necessary functional features to impart solubility.

Component (B) of the curable compositions of this invention comprises one or more ;of the well-known coreactants that are used in addition-curing silicone compositions. By addition-curing it is meant a reaction which comprises hydrosilylation which leads to an increase in viscosity of the composition. Typically, the addition-curing composition is converted from the liquid or flowable state to the solid state or non-flowable state by this reaction. For adhesive-.release coatings the addition-curing composition is sufficiently cured to provide no migration, no smear and no rub-off, as further defined below. Hydrosilylation is represented generically by the following scheme.

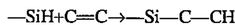

Component (B) can be any organopolysiloxane bearing at east two silicon-bonded hydrogen radicals which are reactive, in hydrosilylations, with the silicon-bonded reactive olefinic radicals of component (A) . Component (B) preferably has a viscosity at 25° C. of from 1 to 1000 cP. In terms of preferred monovalent hydrocarbon radicals, noted above, examples of organohydrogenpoly-siloxanes which are suitable as component (B) for the compositions of this invention include $Me_3SiO(Me_2SiO)_a(MeHSiO)_bSiMe_3$,
$HMe_2SiO(Me_2SiO)_{0.9a}(MePhSiO)_{0.1a}(MeHSiO)_b$-$SiMe_2H$,
$(MeHSiO)_b$, $HMe_2SiO(Me_2SiO)_a(MeHSiO)_bSiMe_2H$,
$HMe_2SiO(Me_2SiO)_aSiMe_2H$, $(HMe_2SiO)_4Si$,
$MeSiO(SiMe_2H)_3$ and
$Me_3Si(MeHSiO)_bSiMe_3$ where Me, Vi and Fh denote methyl, vinyl and phenyl, respectively. The values of the subscripts a and b can be zero or greater; however, the sum of a plus b has a value of up to about 3,000.

Hydrosilylation catalyst component (C) can be any of the platinum group metal-containing materials which catalyze the reaction of silicon-bonded hydrogen atoms with silicon-bonded olefinic hydrocarbon radicals. Component (C) is preferably a platinum- or rhodium-containing material which is used in addition-curing silicone coating compositions. Examples thereof include, but are not limited to, chloroplatinic acid and its compounds and complexes, and rhodium trichloride and its compounds and complexes. U.S. Pat. No. 5,107,008 hereinabove incorporated discloses platinum group mental-containing catalysts that are suitable for use as component (C) in the curable compositions of this invention.

Component (C) is most preferably selected from platinum-containing catalysts since they are most widely used and available and because they provide a more favorable effect for the compositions of this invention in terms of pot life and cure time. A preferred platinum-containing catalyst component in the compositions of this invention is a form of chloroplatinic acid, either as the commonly available hexahydrate form or as the anhydrous form, because it is easily dispersible in organosilicon systems.

A particularly useful catalyst is the composition obtained when chloroplatinic acid is reacted with an aliphatically unsaturated organosilicon compound such as divinyltetramethyldisiloxane, as disclosed by U.S. Pat. No. 3,419,593 incorporated herein by reference.

The amount of platinum group metal-containing catalyst component (C) that is used in the compositions of this invention is not narrowly limited as long as there is a sufficient amount to accelerate a room temperature reaction between the silicon-bonded hydrogen atoms and the silicon-bonded olefinic hydrocarbon radicals of the reactive component. The exact necessary amount of said catalyst component will depend upon the particular catalyst. However, for chloroplatinic acid said amount can be as low as one part by weight of platinum for every one million parts by weight of organosilicon components. Preferably said amount is at least 10 parts by weight, on the same basis.

Organopolysiloxane component (D) can be any organopolysiloxane bearing at least two silicon-bonded olefinic radicals which are reactive in hydrosilylations, with the silicon-bonded reactive radicals of component (B). Component (D) has a viscosity at 25° C. of from 100cP to 100 million cP and more. In terms of preferred monovalent hydrocarbon radicals, noted above, examples of linear organopolysiloxanes which are suitable as component (D) for the compositions of this invention include $PhMeViSiO(Me_2SiO)_aSiPhMeVi$,
$Me_3SiO(Me_2SiO)_a(MeViSiO)_zSiMe_3$,
$ViMe_2SiO(Me_2SiO)_aSiMe_2Vi$,
$(PhMeViSiO(Me_2SiO)_{0.8a}(MePhSiO)_{0.1a}(Ph_2SiO)_{0.1a}SiPhMeVi)$, $HOMe_2SiO(Me_2SiO)_a(MeViSiO)_bSiMe_2OH$ and $ViMe_2SiO(Me_2SiO)_a(MeViSiO)_bSiMe_2Vi$ and where Me, Vi and Ph denote methyl, vinyl and phenyl, respectively. The values of the subscripts x and z can be zero or greater; however, the sum of a plus b has a value of up to about 3,000.

The amounts of organopolysiloxane components to be used in the compositions of this invention are substantially the same compositions of the art. Typically, the amounts of organohydrogenpolysiloxane and olefin-containing organopolysiloxane components to be used are expressed in terms of the mole ratio of silicon-bonded hydrogen atoms to silicon-bonded olefin radicals. This ratio has a value of from about 0.1/1 to 10/1, preferably 0.51 to 5/1 and most preferably 1/1 to 4/1.

In preferred embodiments of the invention, it is desirable to have an inhibitor component present, which can be any of the materials that inhibit the catalytic activity of the platinum group metal-containing catalysts at room temperature but not at elevated temperature. Inhibitors for the platinum group metal-containing catalysts are well known in the organosilicon art as discussed in U.S. Pat. No. 5,107,008 hereinabove incorporated. Examples of various classes of such metal catalyst inhibitors include unsaturated organic compounds such as ethylenically or aromatically unsaturated amides, acetylenic compounds, ethylenically unsaturated isocyanates, olefinic siloxanes, unsaturated hydrocarbon diestars, and conjugated ene-ynes among others.

The amount of inhibitor component to include in the curable compositions of this invention is not critical and can be any amount that will provide the desired inhibition, if any, of the hydrosilylation curing reaction at room temperature, but not so much as to prevent said curing reaction at useful elevated temperatures. To determine an optimum amount of inhibitor, one may simply add an arbitrary amount thereof, such as from 0.1 to 10 percent by weight, based on the weight of the curable components in the composition, observe: the effect of such an amount on the curing behavior of the composition and adjust the amount of inhibitor in the next composition as desired. Generally, the degree of inhibition is directly related to the amount of inhibitor present in the composition.

The amount of fluorescent organopolysiloxane compounds to be used in the compositions is not critical, as long as there is a sufficient amount to permit its fluorescence to be detected in a useful manner, such as for detecting the presence of, measuring the amount of, and/or measuring the degree of cure of, the composition.

While the amount of organopolysiloxane components of the compositions of this invention can all contain fluorescent radicals, it is only necessary for a portion of the olefin radical-containing organopolysiloxane component to contain fluorescent radicals.

It is preferred that an amount of pyrenylidene containing organopolysiloxane, such as from 1–49 weight percent, be used in combination with from 51–99 weight percent of an organopolysiloxane which contains the same type of reactive sites, but is free of pyrenylidene radicals; both percentages being based on the total amount of organopolysiloxane which contains the reactive olefinic radicals. For example, an organopolysiloxane composition of this invention comprises from 1–49 parts by weight of an organopolysiloxane bearing pyrenylidene radicals and vinyl reactive sites and an amount of a pyrenylidene radical-free organopolysiloxane bearing vinyl reactive sites sufficient to provide 100 parts by weight of organopolysiloxanes bearing vinyl reactive sites.

The curable compositions of this invention can further comprise optional components, such as diluents, solvents, fillers, cure control additives, adhesive-release additives, surfactants and wet-out additives, which are well known in the silicone coatings art, and particularly in the adhesive-release coatings art.

The curable compositions of this invention can be prepared by any suitable method, for example, as disclosed in U.S. Pat. No. 5,107,008 hereinabove incorporated. When preparing a curable composition of this invention it is preferred to bring together component (C) and the SiH—containing component (B) in a final mixing step just before the composition is to be used.

The curable compositions of this invention are particularly useful in coating processes where a thin layer of curable composition is applied to a substrate and there-after cured. The fluorescent behavior of said composition allows for the qualitative detection and., with proper calibration of the composition-substrate combination and the use of well-known fluorescence measuring methods, the quantitative detection and application control of the coating. Thus a solution to a major problem in the silicone coatings art has been provided by the present invention.

Substrates to which the curable compositions can be applied include, but may not be limited to paper, polyester film, polyethylene film, polyethylene coated paper and polypropylene film.

Additionally, the curable compositions of this invention are useful for measuring whether proper cure of thin film release liners has been achieved. Since the pyrene-based functional coatings are able to fluoresce in both the monomer and dimer states at different wavelengths when the coatings are exposed to an ultraviolet light source, the .intensity of the resulting monomer and dimer emissions from the release coating can be measured. By comparing the intensities of the monomer and dimer emissions, the degree of cure of the release coating can be determined. This is especially effective for thin coatings, The following examples are disclosed to illustrate the invention and are not to be regarded as limiting. All parts and percentages are by weight, unless otherwise specified, and all temperatures are degrees Celsius. Me and Vi denote, respectively, methyl and vinyl. Viscosities were measured with a rotating spindle viscometer.

Cure time for a composition means the time interval required for the composition, when coated onto 37 lb. Nicolet supercalendered kraft paper using a laboratory trailing blade coater adjusted to 25 psi blade pressure to attain the no smear, no migration, no rub-off condition.

The no smear condition was determined by lightly streaking the coating with a finger and observing for the absence of haze in the streaked area.

The no migration condition was determined by firmly adhearing a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

Visual inspection of the bulk compositions for appearance was made prior to coating as a thin film on paper. The range used for inspection was from transparent or clear to insoluble, with clear indicating that the pyrenylidene functional siloxane was compatible or highly dispersed in the coating composition and insoluble indicating the formation of small droplets or complete phase separation within a few minutes. Hazy, the mid-range value, indicated that the pyrenylidene functional siloxane was still dispersible in the coating composition and stable for at least several hours upon standing at ambient conditions in a closed container.

EXAMPLE I

A mixture of 990.60 grams of a vinyl functional silicone fluid represented by the average formula

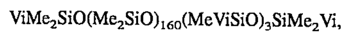

$$ViMe_2SiO(Me_2SiO)_{160}(MeViSiO)_3SiMe_2Vi,$$

9.40 grams of $H_2NCH_2CH_2CH_2(Me)SiO_{2/2}$, and 1.4 grams of potassium silanolate (neutral equivalent 1375 g/K+) was heated at 150° C. for 4 hours, after which it was cooled to room temperature, neutralized with glacial acetic acid and filtered through a pressure filter. The filtrate was a clear, colorless fluid having a viscosity of 385 cs. and an Amine Neutral Equivalent of 12,500 g/$NH_2$. The stoichiometry and chemistry of the reaction mixture supports a reaction product having the average formula:

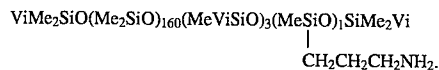

$$ViMe_2SiO(Me_2SiO)_{160}(MeViSiO)_3(MeSiO)_1SiMe_2Vi \text{ with } CH_2CH_2CH_2NH_2 \text{ on Si}$$

A mixture of 150.4 grams ($1.19\times10^{-2}$ moles $NH_2$) of this aminofunctional silicone fluid, 2.75 grams ($1.19\times10^{-2}$ moles) of 1-pyrenecarboxaldehyde, and 90 grams of toluene was heated at reflux for 3 hours. During this time water was removed by azeotropic distillation. The reaction mixture was then devolatilized at 100° C./2 torr to remove toluene and low molecular weight oligomers. After filtration a clear green-yellow fluid was obtained. The product had the average formula, $ViMe_2SiO(Me_2SiO)_{160}(MeViSiO)_3(MeLSiO)_1SiMe_2Vi$, where L denotes the $C_{16}H_9CH{=}NCH_2CH_2CH_2{-}$ radical in which $=CHC_{16}H_9$ is a pyrenylidene nucleus.

EXAMPLE 2

A mixture of 495.0 grams of

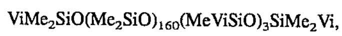

$$ViMe_2SiO(Me_2SiO)_{160}(MeViSiO)_3SiMe_2Vi,$$

14.0 grams of $H_2NCH_2CH_2CH_2(Me)SiO_{2/2}$, and 1.0 grams of potassium silanolate (neutral equivalent 1375 g/K+) was heated at 150° C. for 5.5 hours. After which it was cooled to room temperature and neutralized with glacial acetic acid, filtered through a pressure filter and devolatilized at 145° C./2 torr to yield a clear, colorless fluid having a viscosity of 420 cs. and an Amine Neutral Equivalent of 4170 g/$NH_2$ corresponding to a composition of the average formula:

$$ViMe_2SiO(Me_2SiO)_{160}(MeViSiO)_3(MeSiO)_3SiMe_2Vi$$
$$\quad | \quad CH_2CH_2CH_2NH_2.$$

A mixture of 150.0 grams ($3.59\times10^{-2}$ moles $NH_2$) of this aminofunctional silicone fluid, 8.28 grams ($3.59\times10^{-2}$ moles) of 1-pyrenecarboxaldehyde, and 90 grams of toluene were heated at reflux for 5 hours. During this time water was removed by azeotropic distillation. The reaction mixture was then devolatilized at 100° C./2 torr. After filtration a clear green-yellow fluid was obtained. The product had the average the formula, $ViMe_2SiO(Me_2SiO)_{160}(MeViSiO)_3(MeLSiO)_3SiMe_2Vi$, where L denotes the $C_{16}H_9CH{=}NCH_2CH_2CH_2$— radical in which $=CHC_{16}H_9$ is a pyrenylidene nucleus.

EXAMPLE 3

A mixture of 200.0 grams of an amino endblocked organosiloxane having the average formula $$NH_2CH_2CH_2(Me)_2SiO(Me_2SiO)_{186}Si(Me)_2CH_2CH_2CH_2NH_2$$

having an Amine Neutral Equivalent of 7027 grams/$NH_2$, 12.23 grams (0.14 moles) of (MeViSiO)x mixed cyclosiloxanes, and 0. 83 grams potassium silanolate having a neutral equivalent of 1500 grams/K+ was heated at 150° C. for 4 hours. The mixture was then cooled to room temperature, neutralized with glacial acetic acid, filtered, and devolatilized at 130° C./2 torr to remove low molecular weight oligomers. A clear fluid was recovered with an average composition of $NH_2CH_2CH_2(Me)_2SiO(Me_2SiO)_{186}(MeViSiO)_5Si(Me)_2$-$CH_2\ CH_2CH_2NH\ _2$.

A mixture of 100 grams ($1.37\times10^{-2}$ moles $NH_2$) of this aminofunctional silicone fluid, 3.18 grams ($1.37\times10^{-2}$ moles) 1-pyrenecarboxaldehyde, and 30.0 grams toluene were heated at reflux for 4 hours. During this time water was removed by azeotropic distillation. The material was then devolatilized at 99° C./2 torr to recover a yellow fluid having the average composition, $$LMe_2SiO(Me_2SiO)_{186}(MeViSiO)_5SiMe_2L$$

where L is $CH_2CH_2CH_2N{=}CHC_{16}H_9$ and where $=CHC_{16}H_9$ is the pyrenylidene nucleus. The material was compatible with the vinyl-terminated dimethylmethylvinyl siloxane copolymer of Example 2 in all proportions.

EXAMPLE 4

A mixture of 190.9 grams of $ViMe_2SiO(Me_2SiO)_{160}(MeViSiO)_3SiMe_2Vi$, 9.06 grams of $H_2NCH_2CH_2CH_2(Me)SiO_{2/2}$, and 0.28 grams of potassium silanolate (neutral equivalent 1375 g/K+) was heated at 150° C. for 4 hours. After which it was cooled to room temperature and neutralized with glacial acetic acid and filtered through a pressure filter to yield a clear, colorless fluid having a viscosity of 420 cs. corresponding to a composition having the average formula:

$$ViMe_2SiO(Me_2SiO)_{160}(MeViSiO)_3(MeSiO)_5SiMe_2Vi$$
$$\quad | \quad CH_2CH_2CH_2NH_2.$$

A mixture of 100.0 grams ($3.87\times10^{-2}$ moles $NH_2$) of this amino-organofunctional silicone fluid, 8.91 grams ($3.87\times10^{-2}$ moles) of 1-pyrenecarboxaldehyde, and 100 grams of toluene were heated at reflux for 3 hours. During this time water was removed by azeotropic distillation. The reaction mixture was then devolatilized at 95° C./2 torr. After filtration a clear yellow fluid was obtained having the average composition: $ViMe_2SiO(Me_2SiO)_{160}(MeViSiO)_3(MeLSiO)_5SiMe_2Vi$, where L denotes the $C_{16}H_9CH{=}NCH_2CH_2CH_2$— radical in which $=CHC_{16}H_9$ is a pyrenylidene nucleus.

EXAMPLES 5–9

Four coating compositions of this invention were prepared by mixing predetermined amounts of the pyrenylidene functional siloxanes from Examples 1, 2, 3 and 4 with an adhesive release coating composition, designated compositon A, which cures to an adhesive release coating when mixed with an organohydrogen polysiloxane and heated, and which contained 97.1 parts of a vinyl-terminated dimethyl-methylvinyl siloxane copolymer containing 1.1 mol % vinyl radicals, 1.85 parts of a platinum-containing curing catalyst and 1.05 parts of a platinum catalyst inhibitor which is effective at room temperature but not at elevated temperature.

In addition a pyrenylidene containing siloxane trimer having no vinyl functionality was prepared and incorporated into composition A. A mixture of 41.5 grams of hexamethyldisiloxane, 20.4 grams of $H_2NCH_2CH_2CH_2(MeSiO)_{2/2}$ and 0.01 grams of potassium hydroxide were were heated to 97° C. for 72 hours. The resulting product mixture was fractionally distilled to recover 26.5 grams of clear, colorless fluid having the average formula:

$$Me_3SiO(MeSi)_1SiMe_3$$
$$\quad | \quad CH_2CH_2CH_2NH_2.$$

A mixture of 11.34 grams (0.0407 moles) of this amino-organofunctional silicone fluid, 9.36 grams (0.0407 moles) of 1-pyrenecarboxaldehyde, and 35.22 grams of toluene were heated at reflux for 3 hours removing water by azeotropic distillation. The reaction mixture was then devolatilized at 95° C./2 torr to recover a viscous yellow oil, as analyzed by $^1$HNMR, having the average formula $Me_3SiO(MeLSiO)_1SiOMe3$, where L denotes the $C_{16}H_9CH{=}NCH_2CH_2CH_2$-radical in which $=CHC_{16}H_9$ is a pyrenylidene nucleus. This fluorescent siloxane was designated Siloxane (i).

These coating compositions were applied to 37 lb. Nicolet supercalendered kraft paper, using a laboratory trailing blade coater adjusted to 25 psi blade pressure. The coated papers were heated in a forced air oven at various temperatures to cure the coating to a condition of no smear, no migration and no rub-off described hereinabove. The cured coatings exhibited a green fluorescence when viewed under black light. The compositions and their cure profiles were compared against a comparison composition of the same formulation without the addition of the fluorescent additive to serve as a control. The comparison composition was comprised of 100 parts of composition A and 3 parts of an organohydrogen polysiloxane crosslinker. Table 1 shows the cure profiles of these compositions and the appearance of the coatings as made by visual inspection prior to coating onto the paper, described hereinabove. The fluorescent coating compositions were yellow in color prior to coating. The comparison composition was colorless and clear in appearance. These Examples demonstrate the utility of the compositions of this invention as a fluorescing adhesive release coating which provides undiminished adhesive releasing ability and demonstrates the necessity of having the pyrenylidene functional siloxane reacted into the release coating to prevent transfer of the fluorescent siloxane to the adhesive tape brought into releasable contact with the cured coating.

TABLE I

| Component | Ex. 5 | Ex. 6 | Ex. 7 | Ex. 8 | Ex. 9 |
|---|---|---|---|---|---|
| | Amount, parts | | | | |
| Composition A | 83.0 | 33.0 | 83.0 | 96.3 | 99.3 |
| Crosslinker | 3.0 | 3.0 | 3.0 | 3.0 | 3.0 |
| Example 1 | 17.0 | | | | |
| Example 2 | | 17.0 | | | |
| Example 3 | | | 17.0 | | |
| Example 4 | | | | 3.7 | |
| Siloxane (i) | | | | | 6.8 |
| **Property** | Observed Value | | | | |
| Appearance | Clear | Hazy | Clear | Hazy | |
| Cure Profile*, °C./sec | 110/60 | 120/60 | 120/60 | 110/60 | |

*Control = 100/30

Visual examination under a black light of the adhesive tape used to determine the no migration condition showed no indication of transfer of fluorescence to the adhesive backing for Examples 5–8. Example 9 showed fluorescence under a black light indicating transfer to the adhesive backing. Example 9 is not within the scope of the present invention.

EXAMPLE 10

This example demonstrates the use of the fluoresecent-tagged polymer as a cure sensor. The fluorescent organopolysiloxane from Example 1 was mixed with an adhesive release coating composition comprising 97.1 parts of a vinyl-terminated dimethylmethylvinyl siloxane copolymer containing 1:1 mol % vinyl radicals, 1.85 parts of a platinum-containing curing catalyst, 1.05 parts of a platinum catalyst inhibitor which is effective at room temperature but not at elevated temperature and 3 parts of a methylhydrogen polysiloxane. This resulted in a formulation having a clear appearance when evaluated visually as described hereinabove. This mixture was coated onto BG-50 paper and cured at 130° C. During cure, periodic measurements of the intensity of the monomer and dimer fluorescent emissions were taken using a fluorometer. This polymer, when exposed to a 330 nm ultraviolet light source showed a dimer emission at about 500 nm and a monomer triplet emission at about 382, 400, and 415 nm, with the most prominent peak at 400 nm. The ratio of monomer to dimer emission intensities started at 0.7 and rapidly increased to a plateau at about 2.5. At this point tests described hereinabove on the release liner showed that cure was complete as indicated by a condition of no smear, no migration and no rub-off.

What is claimed is:

1. Organopolysiloxane polymers having the general formula selected from the group consisting of (i) $RR^1{}_2SiO(R^1{}_2SiO)_x(R^1RSiO)_y(R^1LSiO)_zSiR^1{}_2R$, (ii) $RR^1{}_2SiO(R^1RSiO)_y(R^1LSiO)_zSiR^1{}_2R$, (iii) $RR^1{}_2SiO(R^1{}_2SiO)_x(R^1LSiO)_zSiR^1{}_2R$, and (iv) $RR^1{}_2SiO(R^1{}_2SiO)_x(R^1RSiO)_ySiR^1{}_2R$;

wherein $R^1$ denotes a radical selected from the group consisting essentially of alkyl radicals having 1 to 4 carbon atoms and phenyl;

L is a silicon-bonded monovalent organic radical having the general formula $—R^2N{=}CHC_{16}H_9$ wherein $R^2$ is a divalent hydrocarbon radical and wherein $=CHC_{16}H_9$ is a pyrenylidene nucleus;

each R is selected from the group consisting essentially of monovalent hydrocarbon radicals, olefinic hydrocarbon radicals having 2 to 8 carbon atoms, hydroxyl radicals, and L radicals; there being at least 2 reactive olefinic sites on average per molecule of said polymers and at least one L radical on average per molecule of said polymers and the sum of x+ y+ z has a value of at least one.

2. An organopolysiloxane compound as claimed in claim 1 having the formula $$ViMe_2SiO(Me_2SiO)_x(MeViSiO)_y(MeLSiO)_zSiMe_2Vi$$

wherein Vi denotes a vinyl radical; Me denotes a methyl radical; x ranges from 10 to 300; y is from 0 to 5; and z is from 1 to 5.

3. An organopolysiloxane compound as claimed in claim 1 having the formula $LMe_2SiO(Me_2SiO)_x(MeViSiO)_ySiMe_2L$ wherein Vi denotes a vinyl radical; Me denotes a methyl radical; x ranges from 10 to 300; and y is from 1 to 10.

4. A curable composition comprising (A) 1 to 100 parts by weight of an organopolysiloxane compound having the general formula selected from the group consisting of (i) $RR^1{}_2SiO(R^1{}_2SiO)_x(R^1RSiO)_y(R^1LSiO)_zSiR^1{}_2R$, (ii) $RR^1{}_2SiO(R^1RSiO)_y(R^1LSiO)_zSiR^1{}_2R$, (iii) $RR^1{}_2SiO(R^1{}_2SiO)_x(R^1LSiO)_zSiR^1{}_2R$, and (iv) $RR^1{}_2SiO(R^1{}_{2SiO)x}(R^1RSiO)_ySiR^1{}_2R$;

wherein $R^1$ denotes a radical selected from the group consisting of alkyl radicals having 1 to 4 carbon atoms and phenyl;

L is a silicon-bonded monovalent organic radical ]laving the general formula $R^2N{=}CHC_{16}H_9$ wherein $R^2$ is a divalent hydrocarbon radical and wherein $=CHC_{16}H_9$ is a pyrenylidene nucleus;

each R is selected from the group consisting of monovalent hydrocarbon radicals, olefinic hydrocarbon radicals having 2 to 8 carbon atoms, hydroxyl radicals and L radicals; there being at least 2 reactive olefinic sites on average per molecule of said polymers and at least one L radical on average per molecule of said polymers and the sum of x+ y+ z has a value of at least one;

(B) an amount of a methylhydrogen polysiloxane sufficient to provide from 1 to 4 silicon-bonded hydrogen atoms for every silicon-bonded olefinic radical in the composition;

(C) a hydrosilylation catalyst; and (D) 100 parts by weight of an organopolysiloxane bearing at least two silicon-bonded olefinic radicals which are reactive in hydrosilylation.

5. A curable composition comprising (A) 1 to 100 parts by weight of an organopolysiloxane compound having the general formula selected from the group consisting of (i) $RR^1{}_2RSiO(R^1{}_2SiO)_x(R^1RSiO)_y(R^1LSiO)_zSiR^1{}_2R$, (ii) $RR^1{}_2SiO(R^1{}_2RSiO)_y(R^1LSiO)_zSiR^1{}_2R$, (iii) $RR^1{}_2SiO(R^1{}_2SiO)_x(R^1LSiO)_zSiR^1{}_2R$, and (iv) $RR^1{}_2SiO(R^1{}_2SiO)_x(R^1RSiO)_ySiR^1{}_2R$;

wherein $R^1$ denotes a radical selected from the group consisting of alkyl radicals having 1 to 4 carbon atoms and phenyl; with the provisio that 90 mol percent $R^1$ be methyl;

L is a silicon-bonded monovalent organic radical having the general formula $R^2N{=}CHC_{16}H_9$ wherein $R^2$ is a divalent hydrocarbon radical and wherein $=CHC_{16}H_9$ is a pyrenylidene nucleus;

each R is selected from the group consisting of monovalent hydrocarbon radicals, olefinic hydrocarbon radicals having 2 to 8 carbon atoms, hydroxyl radicals and L radicals; there being at least 2 reactive olefinic sites on average per molecule of said polymers and one to five L radicals per molecule of said polymers and the sum of x+ y+ z has a value of at least one;

(B) an amount of a methylhydrogen polysiloxane sufficient to provide from 0.8 to 4 silicon-bonded hydrogen atoms for every silicon-bonded olefinic radical in the composition;

(C) a hydrosilylation catalyst; and (D) 100 parts by weight of a dimethylvinylpolysiloxane.

6. An organopolysiloxane composition as claimed in claim 5 containing in addition, an inhibitor for the hydrosilylation catalyst.

7. An organopolysiloxane composition as claimed in claim 5 wherein component (A) has the formula $$ViMe_2SiO(Me_2Si)_x(MeViSiO)_y(MeLSiO)_zSiMe_2Vi$$

wherein Vi denotes the vinyl radical; Me denotes a methyl radical; X ranges from 10 to 300; y is from 0 to 5; and z is from 1 to 5.

8. An organopolysiloxane composition as claimed in claim 5 wherein component (A) has the formula $$LMe_2SiO(Me_2SiO)_x(MeViSiO)_ySiMe_2L$$

wherein Vi denotes a vinyl radical; Me denotes a methyl radical; x ranges from 10 to 300; and y is from 1 to 10.

9. A composition as claimed in claim 5 when cured on a substrate.

10. A composition as claimed in claim 9 wherein the substrate is paper.

11. A composition as claimed in claim 9 wherein the substrate is selected from the group consisting of polyester film, polyethylene film, polyethlylene coated paper and polypropylene film.

12. A composition as claimed in claim 4 when cured on a substrate.

13. A method for producing a cured composition by applying the composition as claimed in claim 4 to a substrate and thereafter allowing the composition to cure.

14. A method as claimed in claim 13 wherein the coated substrate is heated to enable the composition to cure.

15. A method for producing a cured composition by applying the composition as claimed in claim 5 to a substrate and thereafter allowing the;composition to cure.

16. A method as claimed in claim 15 wherein the coated substrate is heated to enable the composition to cure.

* * * * *